United States Patent
Deisenhofer et al.

(10) Patent No.: US 7,033,404 B2
(45) Date of Patent: Apr. 25, 2006

(54) METHOD FOR PRODUCING AN ANTI-WETTING BARRIER, AND ANODE COMPRISING ONE SUCH ANTI-WETTING BARRIER

(75) Inventors: Ralf Deisenhofer, Senden (DE); Helge Clasen, Ulm (DE); Klaus Gnann, Langenau (DE)

(73) Assignee: EPCOS AG, Munich (DE)

( * ) Notice: Subject to any disclaimer, the term of this patent is extended or adjusted under 35 U.S.C. 154(b) by 237 days.

(21) Appl. No.: 10/476,674

(22) PCT Filed: Apr. 11, 2002

(86) PCT No.: PCT/DE02/01359

§ 371 (c)(1),
(2), (4) Date: Jan. 30, 2004

(87) PCT Pub. No.: WO02/091411

PCT Pub. Date: Nov. 14, 2002

(65) Prior Publication Data

US 2004/0121067 A1 Jun. 24, 2004

(30) Foreign Application Priority Data

May 3, 2001 (DE) .......................... 101 21 548

(51) Int. Cl.
*H01G 9/00* (2006.01)
*H01G 9/04* (2006.01)

(52) U.S. Cl. ........................................ 29/25.03; 361/528
(58) Field of Classification Search ......... 361/523–529, 361/532–540; 29/25.03
See application file for complete search history.

(56) References Cited

U.S. PATENT DOCUMENTS

| 3,967,000 A | 6/1976 | Klein et al. |
| 4,127,680 A | 11/1978 | Shirn et al. |
| 2002/0021547 A1 * | 2/2002 | Sakai et al. ............ 361/532 |
| 2002/0076484 A1 | 6/2002 | Lessner et al. |

FOREIGN PATENT DOCUMENTS

| DE | 1040853.2 | 10/1958 |
| DE | 37 28 337 | 3/1989 |
| DE | 37 39 983 | 7/1993 |
| EP | 0 538 651 | 4/1993 |
| JP | 09018115 | 1/1997 |

* cited by examiner

*Primary Examiner*—Eric W. Thomas
(74) *Attorney, Agent, or Firm*—Fish & Richardson P.C.

(57) ABSTRACT

A method produces an anti-wetting barrier on an electrode that is connected to an anode of an electrolytic capacitor. The method includes applying drops of a fluid anti-wetting agent to the electrode to form the anti-wetting barrier. The drops are applied at intervals so that the anti-wetting barrier is linear after the anti-wetting agent dries.

15 Claims, 2 Drawing Sheets

METHOD FOR PRODUCING AN ANTI-WETTING BARRIER, AND ANODE COMPRISING ONE SUCH ANTI-WETTING BARRIER

TECHNICAL FIELD

This application is directed to producing an anti-wetting barrier on an electrode connected to an anode body of an electrolytic capacitor, and to an anode that contains the anti-wetting barrier. This application is also directed to applying an anti-wetting agent to the electrode to produce the anti-wetting barrier.

BACKGROUND

Examples of electrolytic capacitors include tantalum capacitors that have a porous anode body, an electrode, and an electrically conductive layer. The anode body is connected to the electrode, which is covered by the electrically conductive layer. The anode body is in contact with the electrode and, along with the electrode, makes up to the anode of the electrolytic capacitor. A multilayered cathode is produced on a surface of the anode body from conductive materials by the following processes, which are performed in order: dipping, drying and pyrolysis.

During dipping, the electrode should not come into contact with solutions, suspensions, dispersions and lacquers, i.e., the electrode should not become wet. This is because liquid on the electrode forms a hard deposit on the electrode. This hard deposit adversely affects the electrical characteristics of the resulting capacitor.

It is noted that the electrode can become wet as a result of excessive dipping or as a result of a meniscus formation of liquid used during dipping. The electrode also can become wet via the capillary effect which, in this case, results from channels on a surface of the electrode.

The foregoing hard deposits on the electrode also affect the amount of space the capacitor occupies.

In view of the foregoing, an anti-wetting barrier can be produced on the electrode to prevent the electrode from becoming wet and thereby prevent formation of hard deposits on the electrode. In this regard, the anti-wetting barrier should be placed as closely as possible to the anode body in order to limit and/or prevent the formation of hard deposits.

In electrolytic capacitors, anti-wetting barriers have been used, which include a round wire connected to a capacitor's anode body. The anode body is connected to capacitor electrodes and the round wire is made of a TEFLON® ring spread onto a capacitor electrode before dipping. Such a TEFLON® ring has the disadvantage that it either must be reapplied to the electrode after dipping or it stresses. If the TEFLON® ring remains on the electrode, the TEFLON® ring takes up electrode area and thus increases the size of the capacitor.

A method is known in the prior art, in which a round-wire formed electrode is placed in a continuous stream of fluid anti-wetting agent. An anti-wetting barrier forms on the electrode when the anti-wetting agent dries. This method, however, is not suitable for use with electrodes formed of flat sheet metal. This is because it would require spraying the anti-wetting agent, rather than applying the anti-wetting agent via a continuous stream. As a result, the process becomes uncontrollable.

Furthermore, prior art methods for applying a fluid anti-wetting agent make it difficult to control the amount of anti-wetting agent that is applied. Thus, the volume and/or the space occupied by the anti-wetting barrier are both very difficult to control and to reproduce. Anti-wetting barriers, which are produced according to prior art methods, usually have a width of 500–1000 µm and a height of >10 µm. As a result, such anti-wetting barriers require more space, thereby increasing the size of a resulting electrolytic capacitor.

Furthermore, a protective ring of TEFLON® is technically difficult to achieve with electrodes that are made of flat sheet metal because an oblong slit in the protective ring is necessary.

It is therefore a goal of this application to provide a method for producing an anti-wetting barrier that is relatively small in size.

SUMMARY

In general, in one aspect, the invention is directed to a method for producing an anti-wetting barrier for an electrode that is connected to the anode body of an electrolytic capacitor. According to the method, a fluid anti-wetting agent is applied to the electrode as droplets. The spatial distance of the droplets on the electrode is selected so that after applying the anti-wetting agent, the resulting anti-wetting barrier is linear and continuous.

By forming the anti-wetting barrier using single droplets, it is possible to form the anti-wetting barrier more precisely. This is due to the placement and spatial expansion of the anti-wetting barrier. In particular, the foregoing method makes it possible to attach the

SUMMARY anti-wetting barrier very closely to the anode body. Furthermore, the method makes it possible to produce an anti-wetting barrier with a small thickness and a small width, resulting in an electrolytic capacitor that is relatively small in size.

It is advantageous to produce an anti-wetting barrier that is smaller than 5 µm. An anti-wetting barrier with this thickness is sufficient to prevent the electrode from becoming wet. Furthermore, an anti-wetting barrier with this thickness can be broken up during welding, making it possible to weld a connection onto the electrode.

The width and the thickness of the anti-wetting barrier applied via the drops can be influenced by the volume of the drops, as well as by their viscosity and surface tension. Choosing a small volume of drops, e.g., between 30 and 500 pL, can ensure that the number of drops striking the electrode does not exceed a surface of the electrode. Choosing an attainably low viscosity can ensure that the drops dissolve when applied to the electrode, and that they spread over a large surface area that corresponds to the drop diameter for the electrode. The development of a thin anti-wetting barrier can be obtained in this manner.

As noted, the thickness of the anti-wetting barrier can be influenced by the surface tension of the drops. By increasing the surface tension with a solvent, such as surfactant, dissolution of the drops applied to the electrode can be achieved. As a result, a relatively thin anti-wetting barrier can be produced.

It is also advantageous to produce an anti-wetting barrier with a width of less than 500 µm. Such an anti-wetting barrier occupies less space, thereby reducing the size of an electrolytic capacitor that contains the anti-wetting barrier.

In general, in another aspect, the invention is directed to an anode of an electrolytic capacitor that includes an anode body connected to an electrode. An anti-wetting barrier is applied to the electrode. The anti-wetting barrier is formed from an anti-wetting agent that is applied as a continuous line. The anti-wetting barrier has a thickness of less than 5 μm.

It is advantageous to apply the anti-wetting agent as drops on the electrode using a capillary tube. The use of a capillary tube makes possible precise application of the drops. This improves the reproducibility of the method and, at the same time, enables formation of a more narrow anti-wetting barrier. The drops develop by pressing the anti-wetting agent through the capillary tube.

It is advantageous to apply the drops to the electrode without contact, which means without contact between the capillary tube and the electrode. To do this, a very small amount of liquid can be applied to the electrode without mixing the liquid applied to the electrode by the capillary tube. A suitable distance between the capillary tube and the electrode is between 1 and 5 μm.

Droplets having a volume between 30 and 500 pl can create a relatively narrow and thin anti-wetting barrier for an electrode. The method thus requires relatively little anti-wetting agent.

It is advantageous to use an electrode that has at least a level surface of sides when producing the anti-wetting barrier described herein. Producing an anti-wetting barrier for such electrodes would be possible via a known spraying process, only when there is sufficient area.

The method described herein also applies to anodes, the electrodes of which have a round or oval cross-section and no level surface of sides.

In one implementation of the invention, a TEFLON® suspension can be used for the anti-wetting agent. Such a TEFLON® suspension has the advantage that it is liquid on either side and, on account of this, permits build-up of droplets. In another implementation, the invention contains TEFLON®, which is a highly suitable material for the anti-wetting barrier.

Through simple drying-out of a TEFLON® suspension, a hard anti-wetting barrier can be produced by droplets applied to the electrode. Silicon or another suitable material could also be used as the anti-wetting agent.

In the following, the invention is described in more detail using examples and figures.

DETAILED DESCRIPTION

Figure 1:
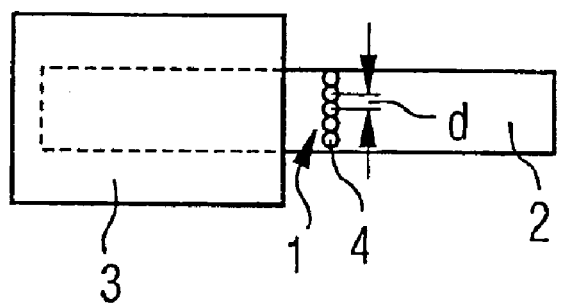
FIG. 1 shows a view of an anode of an electrolytic capacitor, which includes an anti-wetting barrier.

FIG. 1 shows an anode of an electrolytic capacitor that includes an electrode 2, the end section of which is covered by an anode body 3. Near anode body 3, electrode 2 has an anti-wetting barrier 1 that is produced by applying drops 4 at a suitable spatial distance d from one another. The distance d of drops 4 is selected so that anti-wetting barrier 1 develops as a continuous line. Anode body 3 is produced by re-pressing electrode 2 with a powder.

Figure 2A:
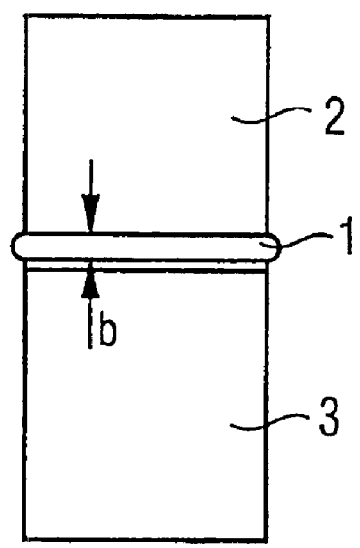
FIG. 2A shows a view of an anode of a wider electrolytic capacitor, which includes an anti-wetting barrier.

FIG. 2A shows the anode of an electrolytic capacitor with an anode body 3 that, in this case, can be a porous tantalum sinter body. Anode body 3 is connected to an electrode 2 that contacts anode body 3. An anti-wetting barrier 1 is arranged closely above anode body 3 and has a width b. Anti-wetting barrier 1 is produced via the method described herein. Anode body 3 is produced by pressing a paste onto electrode 2.

FIG. 2A shows the anode of an electrolytic capacitor with a two-dimensional electrode 2 that is called an anode diverter. A two-dimensional electrode 2 makes possible electrolytic capacitors with improved electrical characteristics.

Figure 2B:
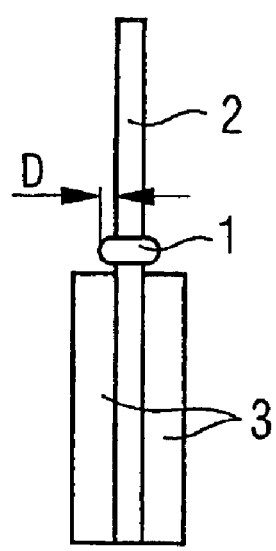
FIG. 2B shows a side view of the anode of FIG. 2A.

FIG. 2B shows the subject of FIG. 2A from a side view. According to FIG. 2B, anode body 3 is set up on one side of the electrode and the anti-wetting barrier has a thickness D. Anode body 2 is produced by pressing a paste onto both sides of electrode 2.

Figure 2C:
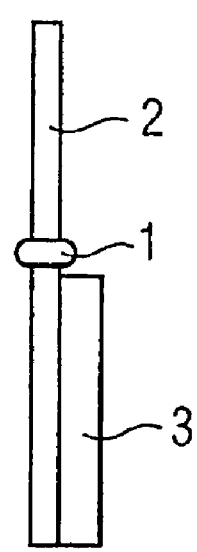
FIG. 2C shows the anode of FIG. 2B with only one side of the anode body.

The anode according to FIG. 2C, in contrast to the anode depicted in FIG. 2B, has an anode body 3 on only one side of electrode 2. Anode body 3 is produced by pressing a paste onto one side of electrode 2.

Figure 3A:
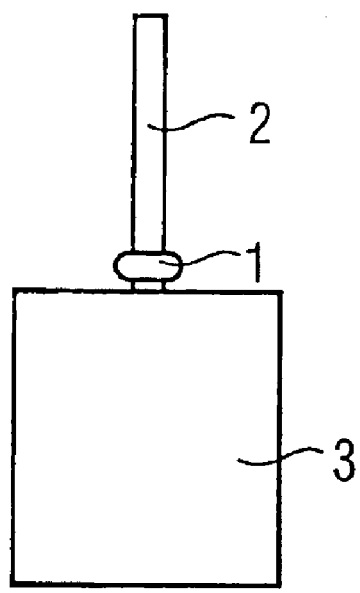
FIG. 3A shows an anode with an electrode formed by a round wire, which includes an anti-wetting barrier.

FIG. 3A shows an electrolytic capacitor having an electrode 2 that is not a flat metal, as shown in FIGS. 2A thru 2C, but instead is a round wire. With such an electrode, the method described herein can be used for application of anti-wetting barrier 1.

DESCRIPTION OF THE DRAWINGS

Figure 3B:
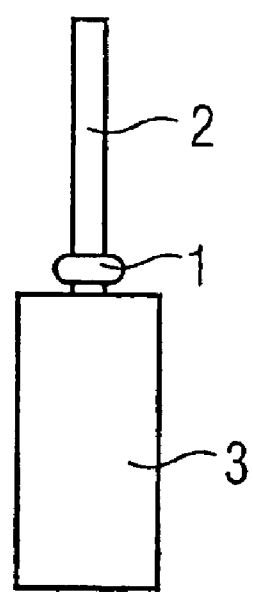
FIG. 3B shows a side view of the anode of FIG. 3A.

FIG. 3B shows the subject of FIG. 3A from a side view.

Figure 4:
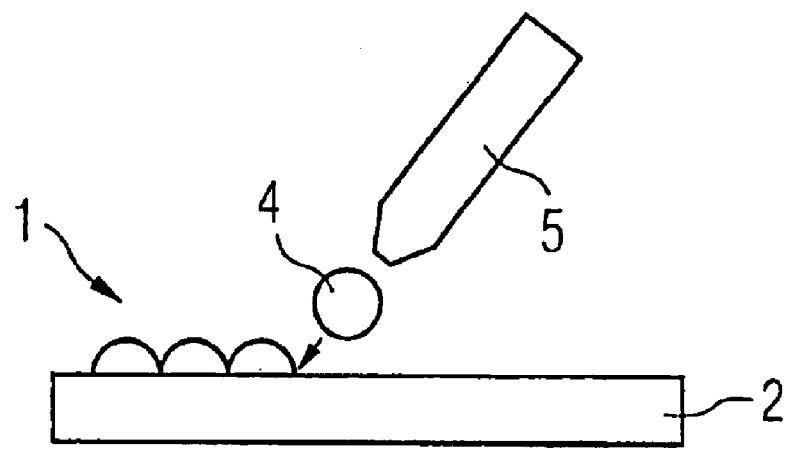
FIG. 4 shows application of an anti-wetting barrier to an electrode via a capillary tube.

FIG. 4 shows production of anti-wetting barrier 1 via capillary tube 5. As shown in FIG. 4, a fluid anti-wetting agent is pressed by capillary tube 5. Therefore, in this case, a TEFLON® suspension, which is thinned with water, can be used. In this case, the product with the name, "Topcoat Clear 852-200," by the DUPONT® Company can be used for the TEFLON® suspension. The suspension may be thinned with 10 to 40 water parts by weight. Such a thinning results in a viscosity of less than 10 mPas at room temperature. The anti-wetting agent can be applied with the help of a piezoactuator, such as "Microdrop", is available from the Microdrop Company, Corporation for Microproportion Systems, Ltd. The anti-wetting agent is applied to electrode 2 with drops and without contact between the capillary tube and the electrode. The spatial distance between drops 4 is selected so that when anti-wetting barrier 1 develops, it is continuous and linear.

By using a capillary tube with, e.g., a nozzle diameter between 30 and 100 μm, drops are produced with a volume between 30 and 500 pl.

DETAILED DESCRIPTION

FIGS. 2A and 2B and/or 3A and 3B show that the anti-wetting barrier applied as a closed ring around electrode 2, which is an advantageous implementation. As a result, the anti-wetting barrier can effectively prevent electrode 2 from becoming wet.

The production method described herein is not limited to use with tantalum capacitors, but may also be used entirely for general production of capacitors from other materials as appropriate, and independently for production of an electrode and a sinter body.

Producing an electrolytic capacitor up until the step of applying an anti-wetting barrier is described in the following using a tantalum electrolytic capacitor as an example.

Tantalum powder is applied to one or both sides of a two-dimensional anode diverter as a paste, which can be a metal. The tantalum powder may be applied by (silk-) screen printing or stencil printing methods. Likewise, a two-dimensional or a wireformed anode diverter can be pressed. Afterward, the anode is sintered in a vacuum at a high temperature. A thin layer of tantalum pentoxide is produced from the tantalum by anode oxidation on the surface of a porous sinter body. This thin layer of tantalum pentoxide corresponds to the dielectric layer of the capacitor.

In this case, the method described herein for producing an anti-wetting barrier for the anode diverter can be used. The method can, however, also be used prior to anode oxidation.

Further steps of the method for producing, e.g., tantalum capacitors, after application of the anti-wetting barrier are described in the following:

A porous sinter body is repeatedly dipped into manganese nitrate, followed by thermal decomposition of an anode with an anti-wetting barrier. A layer of manganese dioxide thus develops on the surface of the porous sinter body. Outer contact layers are produced by dipping into graphite and silver conductive paint.

A cathode diverter, which is a metal, can then be glued to an outer contact layer, through which a prefabricated tantalum electrolytic capacitor is secured.

The invention is not limited to the above described examples.

What is claimed is:

1. A method of producing an anti-wetting barrier on an electrode that is connected to an anode of an electrolytic capacitor, the method comprising:
    applying drops of a fluid anti-wetting agent to the electrode to form the anti-wetting barrier, the drops being applied at intervals so that the anti-wetting barrier is linear after the anti-wetting agent dries.

2. The method of claim 1, wherein the anti-wetting barrier is less than 5 µm thick.

3. The method of claim 1, wherein the anti-wetting barrier has a width of less than 500 µm.

4. The method of claim 1, wherein the drops are applied by pressing the fluid anti-wetting agent through a capillary tube.

5. The method of claim 4, wherein the capillary tube does not contact the electrode when the drops are applied.

6. The method of claim 1, wherein the drops have a volume between 30 and 500 pl.

7. The method of claim 1, wherein the electrode has at least one level side surface.

8. The method of claim 1, wherein the fluid anti-wetting agent comprises a suspension that includes an industrial coating that is hydrophobic.

9. The method of claim 1, wherein the fluid anti-wetting agent has a viscosity of less than 10 mPas.

10. An anode for an electrolytic capacitor, the anode comprising:
    an electrode;
    an anode body connected to the electrode; and
    an anti-wetting barrier having a linear shape formed by application of drops of an anti-wetting agent to the electrode at intervals, the anti-wetting barrier having a thickness of less than 5 µm.

11. The anode of claim 10, wherein the anti-wetting barrier comprises the drops that have dried on the electrode.

12. The anode of claim 10, wherein the anti-wetting barrier has a width of less than 500 µm.

13. The anode of claim 11, wherein the drops have a volume between 30 and 500 pl.

14. The anode of claim 10, wherein the anti-wetting agent comprises a suspension that includes an industrial coating that is hydrophobic.

15. The anode of claim 10, wherein the anti-wetting agent has a viscosity of less than 10 mPas.

* * * * *